(12) United States Patent
Natarajan et al.

(10) Patent No.: US 11,647,004 B2
(45) Date of Patent: May 9, 2023

(54) LEARNING TO TRANSFORM SENSITIVE DATA WITH VARIABLE DISTRIBUTION PRESERVATION

(71) Applicant: International Business Machines Corporation, Armonk, NY (US)

(72) Inventors: Arjun Natarajan, Old Tappan, NJ (US); Ashish Kundu, San Jose, CA (US); Roger C. Raphael, San Jose, CA (US); Aniya Aggarwal, New Delhi (IN); Rajesh M. Desai, San Jose, CA (US); Joshua F. Payne, San Antonio, TX (US); Mu Qiao, Belmont, CA (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 17/211,191

(22) Filed: Mar. 24, 2021

(65) Prior Publication Data

US 2022/0311749 A1   Sep. 29, 2022

(51) Int. Cl.
  *H04L 9/40* (2022.01)
  *G06N 3/088* (2023.01)
  *G06N 3/045* (2023.01)

(52) U.S. Cl.
  CPC ......... *H04L 63/0428* (2013.01); *G06N 3/045* (2023.01); *G06N 3/088* (2013.01)

(58) Field of Classification Search
  CPC ........ G06N 3/088; G06N 3/045; H04L 63/20; H04L 63/0428; H04L 63/0407
  (Continued)

(56) References Cited

U.S. PATENT DOCUMENTS 8,626,749 B1 * 1/2014 Trepetin .............. G06F 21/6254
                                                    707/722
8,627,488 B2   1/2014 Cormode et al.
(Continued)

FOREIGN PATENT DOCUMENTS

WO   2016039676 A1   3/2016
WO   2019246568 A1   12/2019

OTHER PUBLICATIONS

PCT International Search Report and Written Opinion, dated Jun. 22, 2022, regarding Application No. PCT/CN2022/082487, 10 pages.

(Continued)

*Primary Examiner* — Amare F Tabor
(74) *Attorney, Agent, or Firm* — Yee & Associates, P.C.

(57) ABSTRACT

Preserving distributions of data values of a data asset in a data anonymization operation is provided. Anonymizing data values is performed by transforming sensitive data in a set of columns over rows of the data asset while preserving distribution of the data values in the set of transformed columns to a defined degree using a set of autoencoders and loss function. The autoencoders are base trained from pre-existing data in a data assets catalog and actively trained during data dissemination. Parametric coefficients of the loss function are configured and the threshold is generated using policies from an enforcement decision for the data asset and data consumer. The loss function value of a selected row is compared to the threshold. Transformed data values of the selected row are transcribed to an output row when the loss function value is greater than the threshold and disseminated to the data consumer.

20 Claims, 9 Drawing Sheets

(58) Field of Classification Search
USPC .......................................................... 726/26
See application file for complete search history.

(56) References Cited

U.S. PATENT DOCUMENTS

| | | | |
|---|---|---|---|
| 9,946,810 B1* | 4/2018 | Trepetin | G06F 7/00 |
| 10,242,229 B2 | 3/2019 | Mohan et al. | |
| 10,423,781 B2 | 9/2019 | Beskorovajnov et al. | |
| 10,628,608 B2 | 4/2020 | Hebert et al. | |
| 11,188,678 B2* | 11/2021 | Mandal | G06F 16/221 |
| 2015/0007249 A1* | 1/2015 | Bezzi | G06F 21/6227 726/1 |
| 2018/0004978 A1* | 1/2018 | Hebert | G06F 16/2457 |
| 2018/0165475 A1* | 6/2018 | Veeramachaneni | G06N 20/00 |
| 2020/0082272 A1 | 3/2020 | Gu et al. | |
| 2021/0081550 A1 | 3/2021 | Raphael et al. | |
| 2021/0081557 A1 | 3/2021 | Thomson-Wood et al. | |

OTHER PUBLICATIONS

Anonymous, "A Risk Management Framework for Securely Sharing Anonymized Data While Preserving Individual Privacy," An IP.com Prior Art Database Technical Disclosure, IPCOM000204564D, Mar. 3, 2011, 3 pages.

Anonymous, "A method uses dynamic anonymization to protect customer sensitive data during analytics," An IP.com Prior Art Database Technical Disclosure, IPCOM000249015D, Jan. 26, 2017, 7 pages.

Anonymous, "Visualization-Driven Data Transformation Advisor," An IP.com Prior Art Database Technical Disclosure, IPCOM000264045D, Nov. 3, 2020, 7 pages.

Maina et al., "Preservation of Anomalous Subgroups On Machine Learning Transformed Data," Nov. 9, 2019, 5 pages. https://arxiv.org/pdf/1911.03674.pdf.

Turner et al., "Speaker Anonymization with Distribution-Preserving X-Vector Generation for the Voice Privacy Challenge 2020," Jan. 5, 2021, 5 pages. https://arxiv.org/pdf/2010.13457.pdf.

Wei et al., "Distribution-Preserving k-Anonymity," Nov. 5, 2017, 27 pages. https://arxiv.org/pdf/1711.01514.pdf.

* cited by examiner

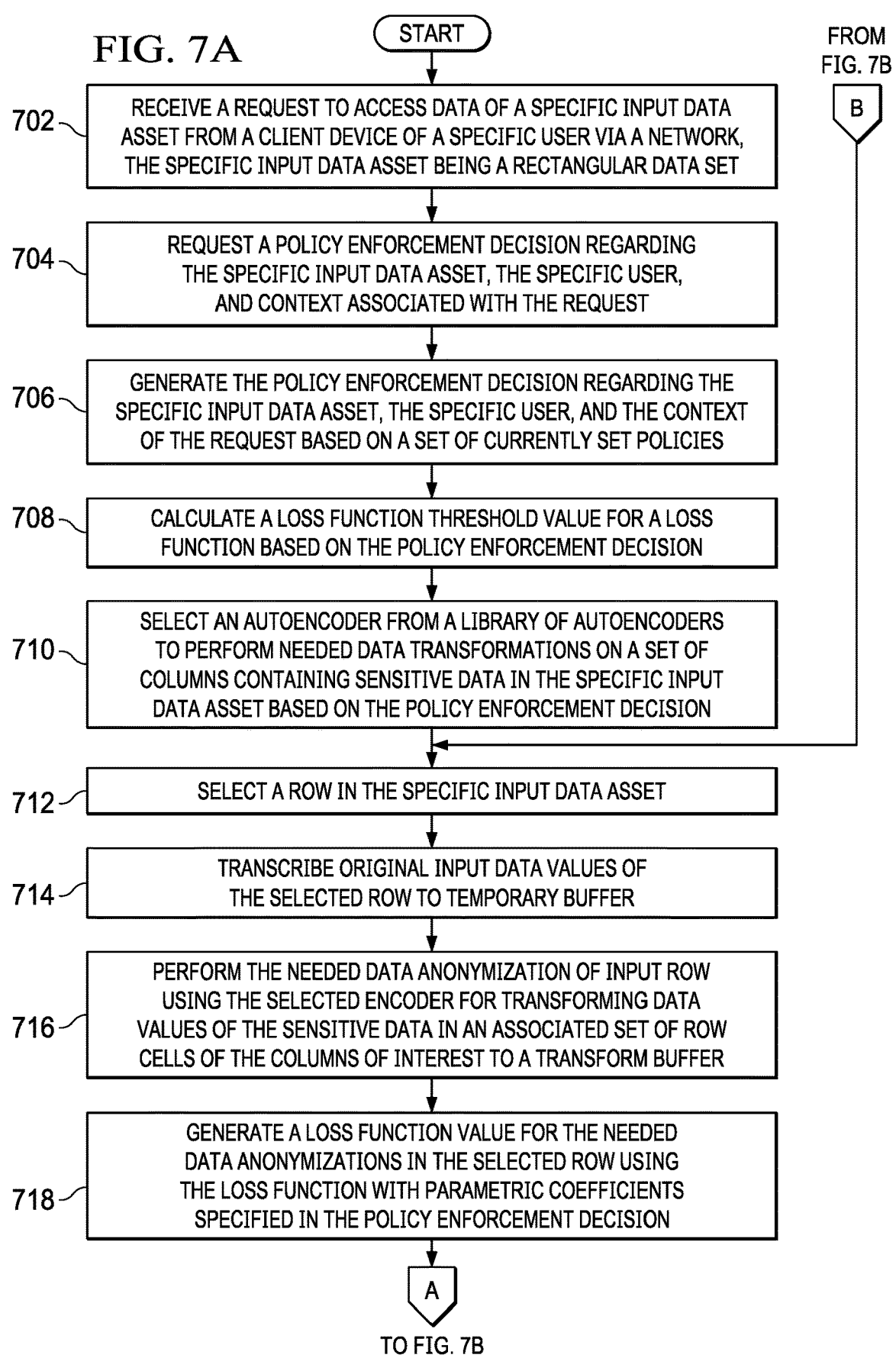

LEARNING TO TRANSFORM SENSITIVE DATA WITH VARIABLE DISTRIBUTION PRESERVATION

BACKGROUND

1. Field

The disclosure relates generally to a system for data security/privacy and more specifically to dynamically transforming sensitive data of a data asset in real time during data dissemination to a data consumer. The specific transformation to data during an anonymization operation is achieved while attempting to preserve the data distribution of the output transformed values, to a desired degree relative to the input data. This is achieved by using an autoencoder for the transformation and a policy-based parameterized loss function for data distribution control.

2. Description of the Related Art

Data dissemination is the distribution or transmitting of data to a data consumer. A data consumer may be, for example: a human; an entity, such as a business, enterprise, company, organization, institution, or agency; a software application; an online service; or the like. Data security is the process of protecting data by adopting a set of policies that identify the relative importance of different data sets, sensitive nature of the different data sets, and regulatory compliance requirements corresponding to the different data sets, and then applying appropriate policies to secure a given data set. Elements of data security may include confidentiality, integrity, and availability. These elements can be used as a guide to keep sensitive data protected from unauthorized access. For example, confidentiality ensures that data is accessed only by authorized users. Integrity ensures that data are accurate. Availability ensures that data are available and accessible to satisfy a data consumer's needs.

Data privacy is the relationship between the collection and dissemination of data, expectation of data privacy, and regulatory issues surrounding them. Data privacy presents a challenge since data privacy attempts to use data, while protecting an individual's sensitive data or personally identifiable information. Personally identifiable information is any information, such as, for example, name, address, telephone number, social security number, or the like, corresponding to an identifiable person that can be used to identify that particular person.

SUMMARY

According to one illustrative embodiment, a computer-implemented method for preserving distributions of data values of a data asset in a data anonymization operation is provided. Data anonymizations of a selected row in the data asset are performed using an autoencoder for transforming data values of sensitive data in an associated set of row cells of columns of interest to a transform buffer. A loss function value is generated for the data anonymizations in the selected row using a loss function with parametric coefficients specified in a policy enforcement decision. The loss function value is compared to a loss function threshold value. Transformed data values in the transform buffer are transcribed using forward mapping to real row cell values suitable for a specific user to an output buffer labeled as output in response to determining that the loss function value is greater than the loss function threshold value based on the comparing. The output buffer labeled output is transferred to a next row for an output of the data asset. According to other illustrative embodiments, a computer system and computer program product for preserving distributions of data values of a data asset in a data anonymization operation are provided.

BRIEF DESCRIPTION OF THE DRAWINGS

FIGS. 7A-7C are a flowchart illustrating a process for policy enforcement to transform sensitive data in accordance with an illustrative embodiment.

DETAILED DESCRIPTION

Figure 1:
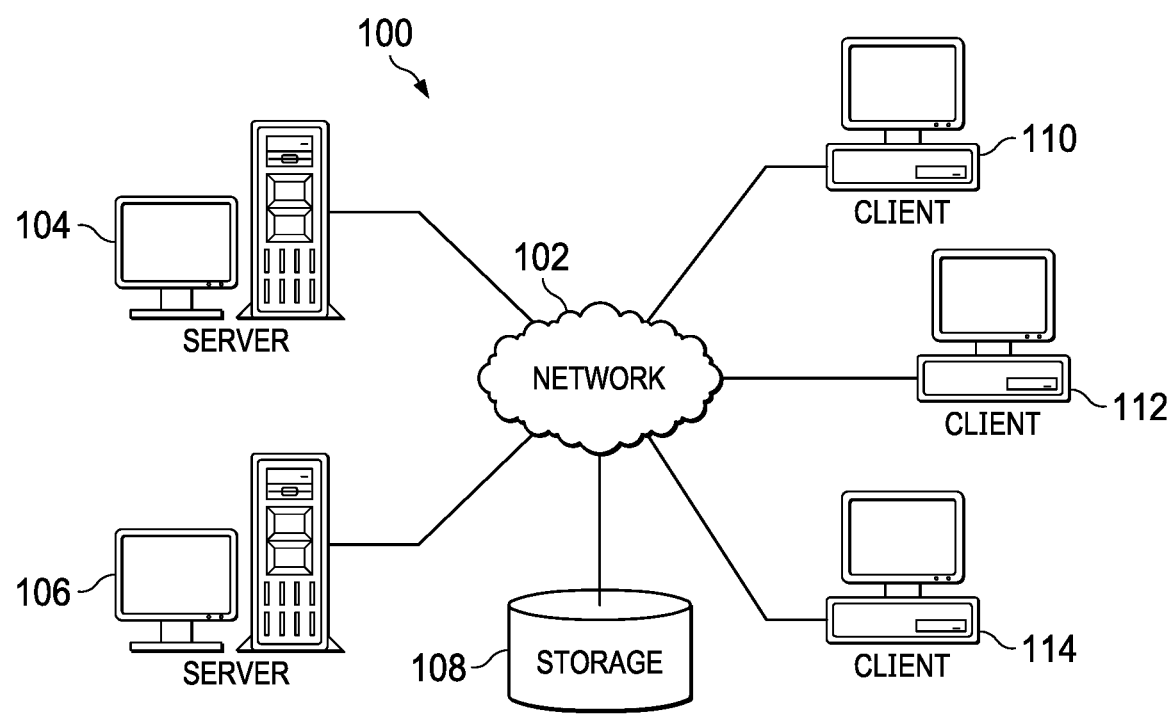
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
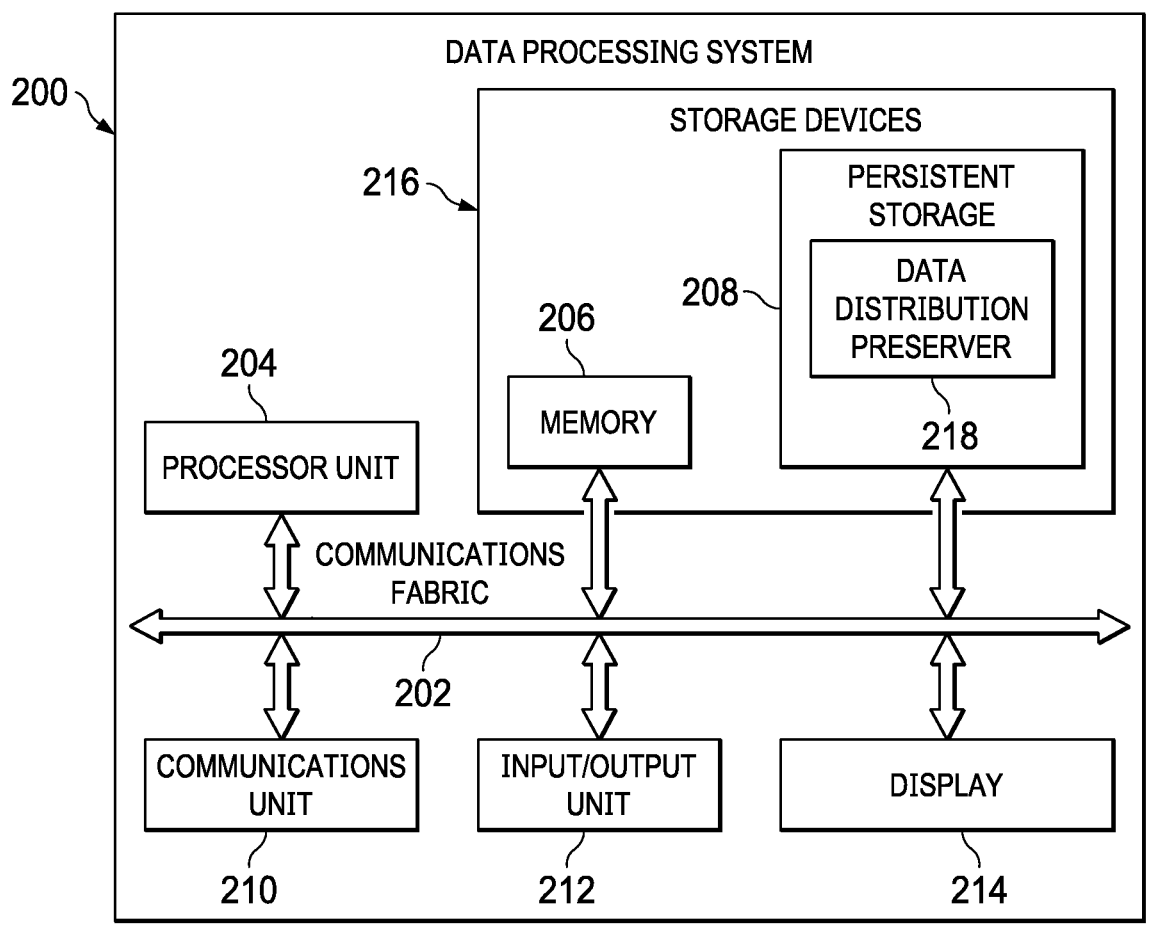
FIG. 2 is a diagram of a data processing system in which illustrative embodiments may be implemented.
Figure 2:
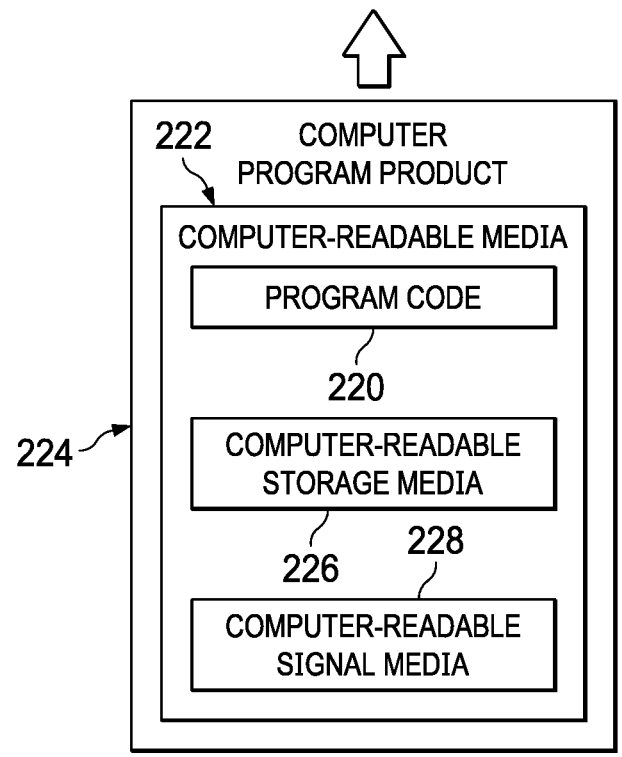

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide one or more data privacy services by physically transforming sensitive data of a user requested data asset (e.g., a rectangular data set comprised of columns and rows) to anonymized data values while preserving distribution of the values of the data asset to a defined degree based on policy using an autoencoder with loss function. Also, it should be noted that server 104 and server 106 may each represent a cluster of servers in one or more data centers. Alternatively, server 104 and server 106 may each represent multiple computing nodes in one or more cloud environments.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart televisions, and the like, with wire or wireless communication links to network 102. Users (i.e., data consumers) corresponding to clients 110, 112, and 114 may utilize clients 110, 112, and 114 to access data assets hosted or protected by server 104 and server 106. The data assets hosted or protected by server 104 and server 106 may be any type of data set (e.g., transaction data, marketing data, financial data, healthcare data, or the like), which contains sensitive data (e.g., name, address, telephone number, social security number, credit card number, and the like) that can personally identify individuals and is not available for access without specific consent by the individuals.

Storage 108 is a network storage device capable of storing any type of data in a structured format or an unstructured format. In addition, storage 108 may represent a plurality of network storage devices. Further, storage 108 may store a plurality of different data assets, which are protected by server 104 and server 106. Furthermore, storage 108 may store other types of data, such as authentication or credential data that may include usernames, passwords, and biometric templates associated with client device users, for example.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer-readable program code or instructions implementing the data privacy processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores data distribution preserver 218. However, it should be noted that even though data distribution preserver 218 is illustrated as residing in persistent storage 208, in an alternative illustrative embodiment, data distribution preserver 218 may be a separate component of data processing system 200. For example, data distribution preserver 218 may be a hardware component coupled to communication fabric 202 or a combination of hardware and software components. In another alternative illustrative embodiment, a first set of components of data distribution preserver 218 may be located in data processing system 200 and a second set of components of data distribution preserver 218 may be located in a second data processing system, such as, for example, server 106 in FIG. 1.

Data distribution preserver 218 controls the process of dynamically transforming sensitive data of a data asset in real time during data dissemination to a requesting data consumer. Data distribution preserver 218 achieves the specific transformation to the requested data during an anonymization operation preserving the transformed values of the output data distributions to a desired degree relative to the input data. Data distribution preserver 218 controls this anonymization operation declaratively based on policy using an autoencoder with parametrized loss function.

As a result, data processing system 200 operates as a special purpose computer system in which data distribution preserver 218 in data processing system 200 enables transformation of sensitive data within a data asset while preserving distribution of the original data asset. In particular, data distribution preserver 218 transforms data processing system 200 into a special purpose computer system as compared to currently available general computer systems that do not have data distribution preserver 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

In dynamic data dissemination where data access is controlled by policies, it is apparent that each data consumer (e.g., user in a user context) accessing data through the dissemination layer could encounter a different applicable transformation of values of that data, which is visible to that particular data consumer. It is prohibitive in terms of storage and compute resource costs to pre-process every known data asset a priori for each different data consumer. As a result, a system is needed where the data assets are in raw form and, at each instance of data access, the system would perform necessary data transformations as fast as possible. This system would require a fast transformation method using a stateless approach to rows of data so streaming can be used. Also, in most data consumption use cases, there should be a parametric approach to a loss function to determine the tradeoff between data utility and data privacy needs. This parametric approach to a loss function requires yet another mechanism that needs to be present over and above the actual act of data transformation. However, this approach does not currently exist in data transformation systems today.

Current systems that perform data transformation rely on costly classical deterministic, algorithmic transformation methods, such as tokenization, redaction, obfuscation, and the like. Each of these methods require a specific transformation type implementation. Some of these transformation types are highly stateful requiring full processing of the source data asset before attempting to generate the first output row of data (i.e., tuple), which prevents data streaming use cases.

Few systems attempt to preserve distribution of the data transformation output. In addition, these systems sacrifice row data integrity and are known to be singular column based. Illustrative embodiments utilize a trained autoencoder that generates the necessary data physical transformations using tunable parametric coefficients of a loss function that achieves the necessary variability of the data value distribution. An autoencoder is a type of artificial neural network used to learn in an unsupervised manner. In other words, an autoencoder does not require labeled input data to enable learning. Typically, an autoencoder has an input layer, one or more internal hidden layers that perform the data processing, and an output layer. The training of an autoencoder is performed through backpropagation.

For each row of data in the data asset to be transformed, illustrative embodiments select the columns (e.g., attributes) of interest in the data asset that need transformation as input to the autoencoder with loss function of illustrative embodiments. Illustrative embodiments select the columns based on one or more policies. A policy includes, for example, a column of interest, such as name, salary, address, social security number, credit card number, or any other type of sensitive information, that needs transformation prior to access to such information by a particular data consumer (e.g., user) in a particular context, such as geolocation when requesting access, time of day of the access request, role when requesting the access, and the like. A specific example of a policy may be, "if data asset is sensitive and data asset contains name and data asset contains salary, then transform (pseudo-anonymize (name, salary) preserve distribution 0.75)". This specific example indicates a sample instance of a set of possible policies that drives a policy enforcement decision and subsequent transformation of a requested data asset preserving distribution of values of the requested data asset to a defined degree based on policy at dissemination time.

The policy may also include a best fitting statistical distribution, such as a normal distribution, lognormal distribution, beta distribution, or the like, for the column of interest, along with parameters for the best fitting statistical distribution, such as mean, minimum, maximum, and the like. In addition, the policy may include parametric coefficients for the loss function, such as a parametric coefficient "$\rho$" (rho) measuring an amount of variance within a column of interest between data asset input and data asset output, a parametric coefficient "$\phi$" (phi) measuring an amount of variance in columns of interest within a row between data asset input and data asset output, and a parametric coefficient "$\tau$" (tau) measuring an amount of variance in the mean of the columns of interest over the entire data asset between data asset input and data asset output, for balancing data utility needs of data consumers and data privacy needs of individuals. High data utility for data consumers means data that have values close to the original data values. High data privacy for individuals means data that do not expose any sensitive information.

It should be noted that illustrative embodiments may select the autoencoder from a library of autoencoders for a specific data asset, a specific column of interest containing a relevant data class in a data asset, a group of columns of interest in a data asset, or a specific row in a column of interest. Illustrative embodiments may utilize a 2-dimensional arrangement of the autoencoder library. For example, the first dimension may be based on columns of interest containing relevant data classes and the second dimension may be based on data utility versus data privacy needs. The second dimension may be, for example, coarse values of the loss function corresponding to choice of depth of value distribution preservation to a predefined degree, such as X % of value distribution preservation, for the data asset output as dictated by policy.

Illustrative embodiments can train the autoencoder from any data asset input, whether that be all available data assets or a subset of data assets based on a desired type or category of data asset. Also, it should be noted that the loss function parametric coefficient rho is on a sliding scale. For example, if the value of rho is zero, then complete data privacy and no data utility exists as the autoencoder will generate random values for the row cells of the columns of interest because the loss function is not incentivized to take into account how close the output of the data asset is to the input of the data asset. Conversely, if the value of rho is as large as possible, then no data privacy and complete data utility exists because the data asset output will be similar to the data asset input. Further, the loss function parametric coefficient phi is also on a sliding scale. For example, the value of phi controls the amount of variance between two columns of interest in the data asset input versus the amount of variance between the same two columns of interest in the data asset output. This comparison captures dependence between columns of interest.

To control the balance between data privacy and data utility needs, illustrative embodiments utilize a classical or standard deterministic transformation method to observe different data asset outputs by varying the loss function parametric coefficients rho and phi. The classical deterministic transformation method provides ground truth in training the autoencoders. Active autoencoder learning is based on backpropagation of computed loss function values as reinforcement or penalty when compared to a defined loss function threshold value. For example, a computed loss function value over the defined threshold is treated as reinforcement and a computed loss function value under the defined threshold is treated as a penalty.

Furthermore, illustrative embodiments minimize disclosure of sensitive data (e.g., unlinkability) by computing entropy of the input data asset. Entropy quantifies the amount of uncertainty involved in the values of the input data asset. Illustrative embodiments also determine an entropy threshold for the input data asset. In addition, illustrative embodiments may define a policy to also include the entropy threshold. Illustrative embodiments may generate a policy enforcement decision based on the entropy of the data asset. Moreover, illustrative embodiments may define a policy to include sensitivity of the data asset regarding transformation changes. Illustrative embodiments may generate a policy enforcement decision based on sensitivity of the data asset regarding transformation changes.

Illustrative embodiments generate anonymized data for row cells of columns of interest while maintaining the original distribution of values based on policy, which includes the entropy threshold and sensitivity of the data asset regarding transformation. Furthermore, if the data asset has a certain level of sensitivity, then illustrative embodiments utilize a Laplacian noise function to add Laplacian noise while performing a distribution-preserving transformation to provide increased data privacy. The data consumer or user can still utilize the transformed data by keeping in mind the modification of the distribution caused by the addition of the Laplacian noise. Adding noise from a Laplacian distribution function to a data asset output (i.e., anonymized data values of columns of interest across multiple rows) provides a differential privacy adjustment to the data asset output to prevent distribution inference. Differential privacy enables sharing information regarding a data asset by describing patterns within the data asset while withholding sensitive information corresponding to individuals in the data asset.

Illustrative embodiments utilize rectangular data sets known as data assets herein. Illustrative embodiments can assign a particular data asset for specific transformation based on one or more policies and the specific data consumer attempting to access the data asset. Illustrative embodiments profile each received data asset to detect data classes corresponding to each respective data asset. The policies provide an ordered set of transformations needed for specific access requests. The transformations are based on the relevant data classes in a specific data asset and the current policies in the system. The depth of distribution preservation is achieved by parametrizing the coefficient tau of the loss function. Illustrative embodiments perform pseudo-anonymization transformations only. However, alternative illustrative embodiments may perform other transformation types without using group column autoencoders, but rather single column autoencoders.

Thus, illustrative embodiments provide one or more technical solutions that overcome a technical problem with transforming sensitive data of a requested data asset while preserving distribution of values of the data asset to a defined degree. As a result, these one or more technical solutions provide a technical effect and practical application in the field of data privacy.

Figure 3:
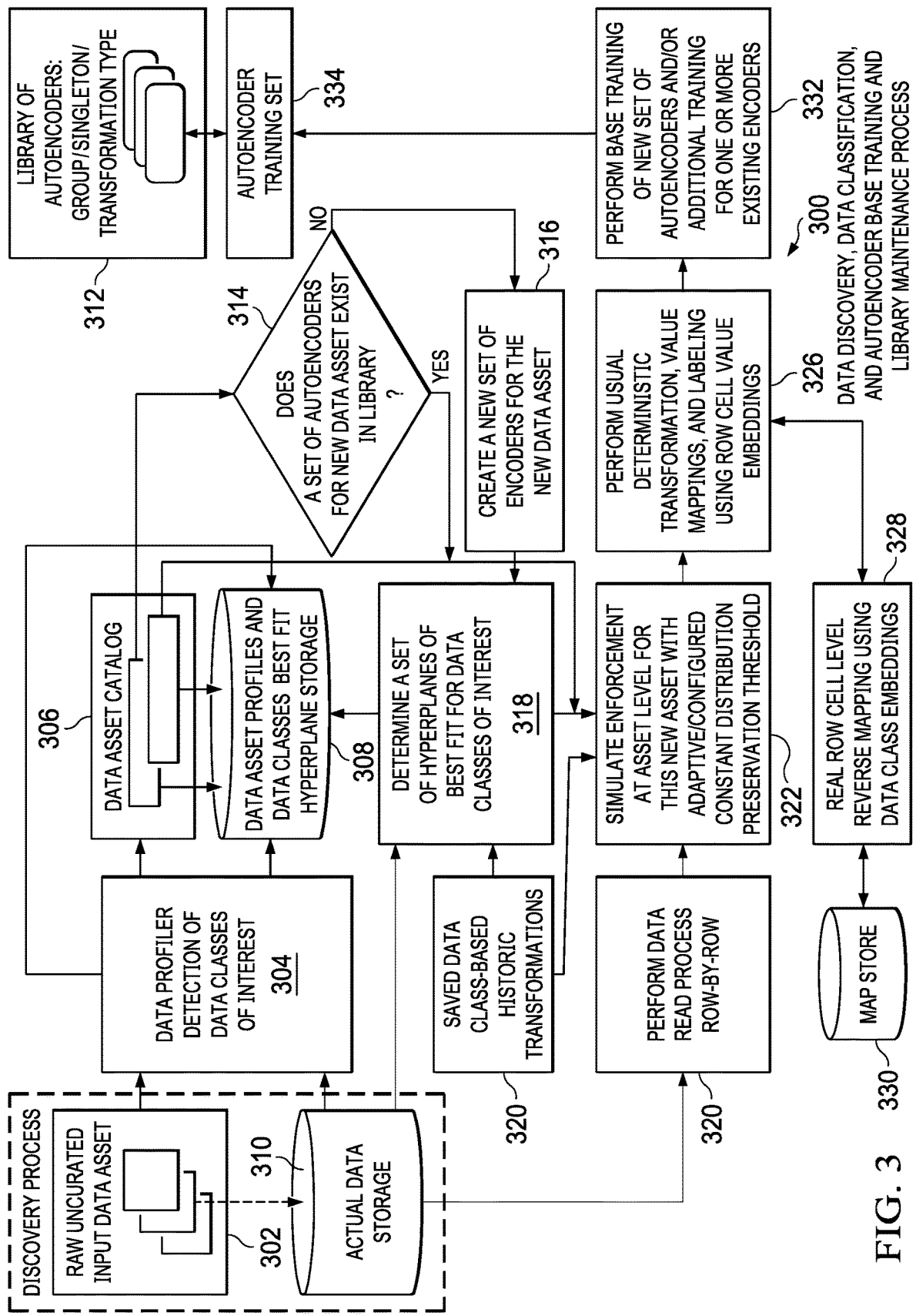
FIG. 3 is a diagram illustrating an example of a data discovery, data classification, and autoencoder base training and library maintenance process in accordance with an illustrative embodiment.

With reference now to FIG. 3, a diagram illustrating an example of a data discovery, data classification, and autoencoder base training and library maintenance process is depicted in accordance with an illustrative embodiment. Data discovery, data classification, and autoencoder base training and library maintenance process 300 may be implemented in a computer, such as server 104 in FIG. 1 or data processing system 200 in FIG. 2.

In this example, data discovery, data discovery, data classification, and autoencoder base training and library maintenance process 300 includes raw uncurated input data asset 302, data profiler 304, data asset catalog 306, data asset profiles and data classes best fit hyperplane storage 308, actual data storage 310, and library of autoencoders 312. However, it should be noted that data discovery, data discovery, data classification, and autoencoder base training and library maintenance process 300 is intended as an example only and not as a limitation on illustrative embodiments. In other words, data discovery, data discovery, data classification, and autoencoder base training and library maintenance process 300 may include more or fewer components than illustrated. For example, a component may be divided into two or more components, two or more components may be combined into one component, components not shown may be added, or the like.

Raw uncurated input data asset 302 is a rectangular (e.g., relational) data set comprised of columns and rows. In addition, raw uncurated input data asset 302 may represent any type of data set that contains sensitive data, such as, for example, names, addresses, telephone numbers, social security numbers, salary, and the like, which can personally identify individuals. Raw uncurated input data asset 302 is input into data profiler 304. Data profiler 304 may represent any type of data profiler capable of detecting data classes of interest, which contain sensitive information, within raw uncurated input data asset 302.

A data distribution preserver, such as, for example, data distribution preserver 218 in FIG. 2, registers input data asset 302 with data asset catalog 306 and determines that input data asset 302 is a new data asset. The data distribution preserver also stores all data asset profiles and their corresponding data classes best fit hyperplanes in data asset profiles and data classes best fit hyperplane storage 308. In addition, at 314, the data distribution preserver determines whether a set of one or more autoencoders for the new data asset exists in library of autoencoders 312.

At 316, if the data distribution preserver determines that a set of autoencoders for the new data asset does not currently exist in library of autoencoders 312, then the data distribution preserver generates a new set of autoencoders for the new data asset. Further, at 318, the data distribution preserver determines a set of one or more hyperplanes of best fit for the data classes of interest detected while profiling the new data asset (i.e., raw uncurated input data asset 302). Furthermore, at 320, the data distribution preserver performs a data read process row-by-row of the new data asset from actual data storage 310. Moreover, at 322, the data distribution preserver simulates enforcement at the data asset level for the new data asset with an adaptive or configured constant distribution preservation threshold using as input the determined set of best fit hyperplanes for the data classes of interest, the row-by-row data reads, and saved data class-based historic transformations 324. If the data distribution preserver determines that a set of autoencoders for the new data asset does currently exist in library of autoencoders 312, then the data distribution preserver simulates enforcement at the data asset level for the new data asset with an adaptive or configured constant distribution preservation threshold using as input the row-by-row data reads and saved data class-based historic transformations 324.

At 326, the data distribution preserver performs the usual or classic deterministic transformation of the new data asset, value mappings, and labeling using row cell value embeddings. At 328, the data distribution preserver also performs real row cell level reverse mapping using data class embeddings. The data distribution preserver stores the real row cell level reverse mapping in map store 330.

At 332, the data distribution preserver performs at least one of base training of the new set of autoencoders for the new data asset or additional training for one or more existing autoencoders to form autoencoder training set 334. The data distribution preserver utilizes autoencoder training set 334 to train autoencoders in library of autoencoders 312. Library of autoencoders 312 contains a plurality of different autoencoders. For example, library of autoencoders 312 may include a group of autoencoders for one data asset, one autoencoder for one data asset, one autoencoder for one data class of interest in a data asset, one autoencoder for one particular row or transformation type in a data asset, and the like.

Figure 4:
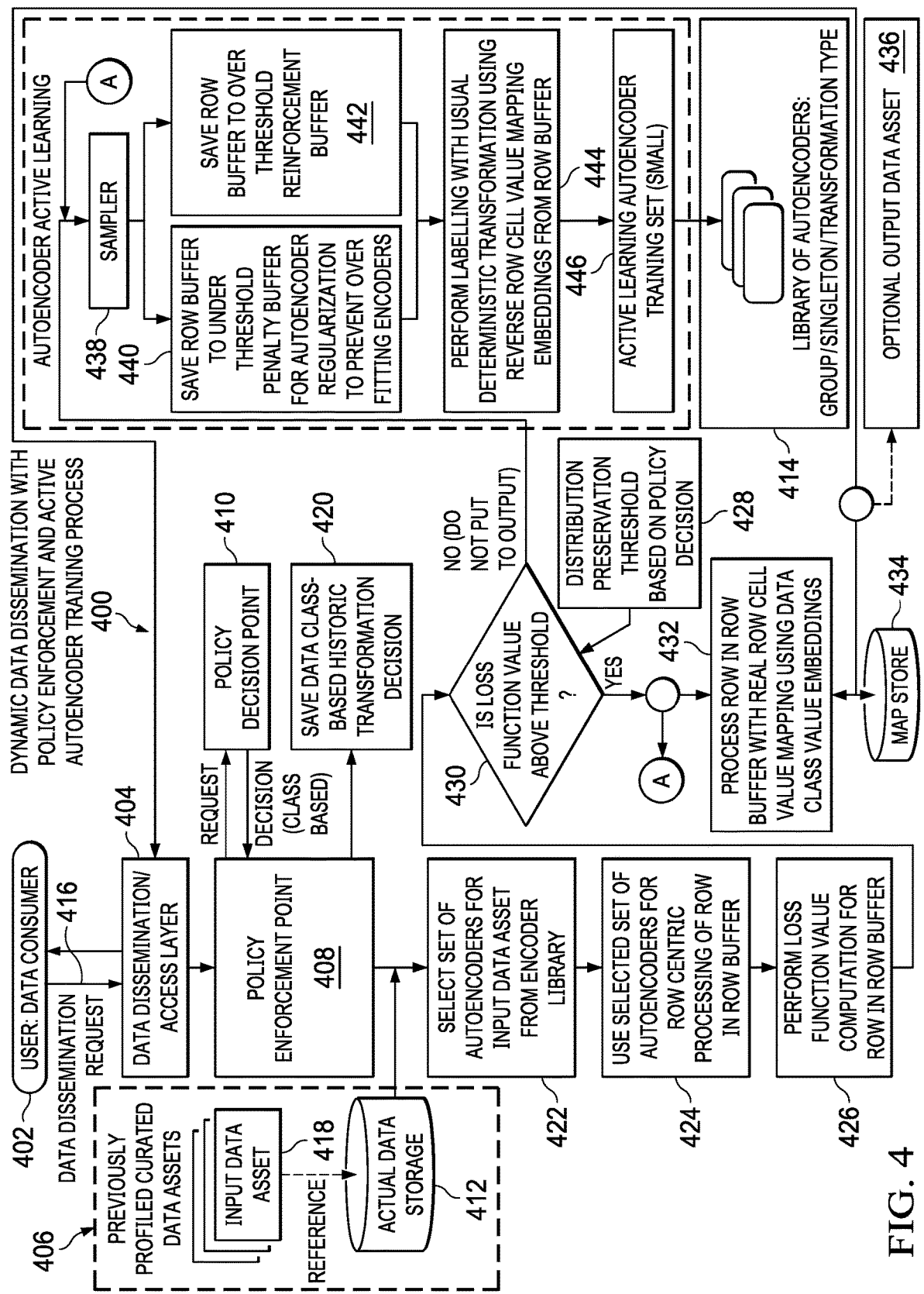
FIG. 4 is a diagram illustrating an example of a dynamic data dissemination with policy enforcement and active autoencoder training process in accordance with an illustrative embodiment.

With reference now to FIG. 4, a diagram illustrating an example of a dynamic data dissemination with policy enforcement and active autoencoder training process is depicted in accordance with an illustrative embodiment. Dynamic data dissemination with policy enforcement and active autoencoder training process 400 may be implemented in a computer, such as server 104 in FIG. 1 or data processing system 200 in FIG. 2.

In this example, dynamic data dissemination with policy enforcement and active autoencoder training process 400 includes user 402, data dissemination/access layer 404, previously profiled and curated data assets 406, policy enforcement point 408, policy decision point 410, actual data storage 412, and library of autoencoders 414. However, it should be noted that dynamic data dissemination with policy enforcement and active autoencoder training process 400 is intended as an example only and not as a limitation on illustrative embodiments. In other words, dynamic data dissemination with policy enforcement and active autoencoder training process 400 may include more or fewer components than illustrated. For example, a component may be divided into two or more components, two or more components may be combined into one component, components not shown may be added, or the like.

User 402 is a data consumer. User 402 may be, for example, a human, a process, an application, a service, a system, or the like. User 402 submits data dissemination request 416 for input data asset 418 to data dissemination/access layer 404. User 402 may submit data dissemination request 416 with a particular user context. The user context may be, for example, location of where data dissemination request 416 was submitted from, time of day and day of week user 402 submitted data dissemination request 416, and the like. Data dissemination/access layer 404 sends data dissemination request 416 to policy enforcement point 408.

Policy enforcement point 408 sends a policy enforcement decision request corresponding to data dissemination request 416, the user, and the user context of data dissemination request 416 to policy decision point 410. Policy decision point 410 selects a set of policies corresponding to data dissemination request 416, the user, and the user context of data dissemination request 416. Policy decision point 410 generates a data class-based policy enforcement decision based on the selected policies. Policy decision point 410 sends the data class-based policy enforcement decision to policy enforcement point 408. At 420, policy enforcement point 408 saves the data class-based policy enforcement decision.

At 422, a data distribution preserver, such as, for example, data distribution preserver 218 in FIG. 2, selects a set of autoencoders for input data asset 418 from library of autoencoders 414. The data distribution preserver utilizes input data asset 418 as a reference to retrieve actual data from actual data storage 412 while selecting the set of autoencoders at 422. At 424, the data distribution preserver utilizes the selected set of autoencoders for row-centric processing of a row in a row buffer. At 426, the data distribution preserver utilizes a loss function to perform a loss function value computation for the row in the row buffer. Further, at 428, the data distribution preserver compares the loss function value to a distribution preservation threshold that is based on the data class-based policy enforcement decision. The distribution preservation threshold is an adaptable or configured threshold.

At 430, the data distribution preserver makes a determination as to whether the computed loss function value is above the distribution preservation threshold. If the data distribution preserver determines that the computed loss function value is above the distribution preservation threshold, then the data distribution preserver processes the row in the row buffer with real row cell value mappings using data class value embeddings at 432. The data distribution preserver retrieves the real row cell value mappings from map store 434. The data distribution preserver utilizes the processing of the rows in the row buffer at 432 as the data dissemination response to data dissemination request 416. The data distribution preserver sends the data dissemination response to data dissemination/access layer 404. Data dissemination/access layer 404 then sends the data dissemination response to user 402. Alternatively, the data distribution preserver can optionally generate output data asset 436.

If the data distribution preserver determines that the computed loss function value is not above the distribution preservation threshold, then the data distribution preserver utilizes a sampler for random row samples from the row buffer at 438. In addition, at 440, the data distribution preserver saves the random row samples from the row buffer to an under-threshold penalty buffer for autoencoder regularization to prevent overfitting of autoencoders. In the case where the computed loss function value was above the distribution preservation threshold, the data distribution preserver saves the random row samples from the row buffer to an over threshold reinforcement buffer at 442.

The data distribution preserver utilizes the under-threshold penalty buffer and the over threshold penalty buffer to perform labeling with usual or classic deterministic transformation using reverse row cell value mapping embeddings from the row buffer at 444. At 446, the data distribution preserver utilizes the labeling with usual deterministic transformation to generate a small active learning autoencoder training set. The smaller the training set, the less time is required to train the autoencoders. The data distribution preserver utilizes active learning autoencoder training set to train autoencoders in library of autoencoders 414.

Figure 5:
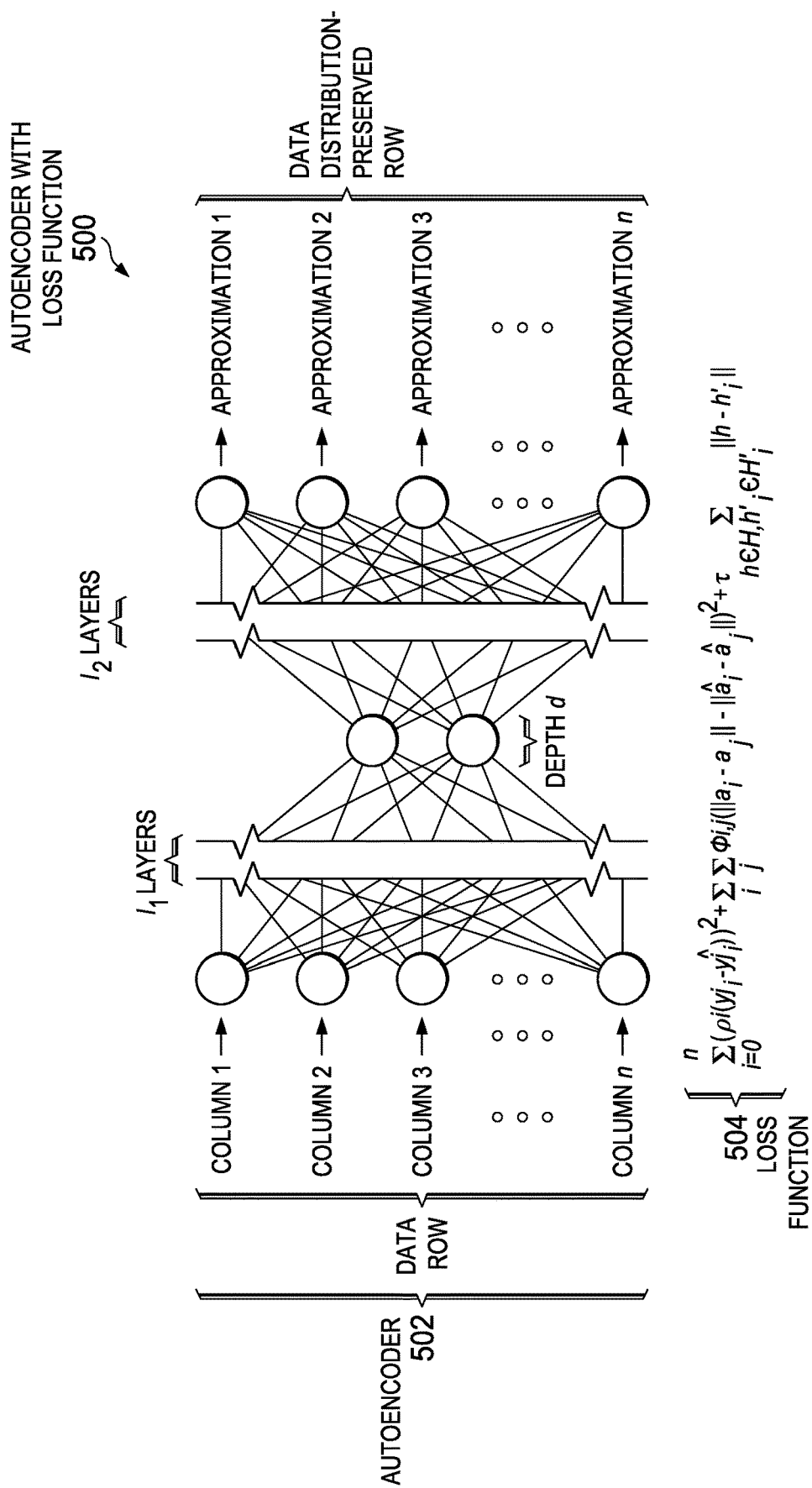
FIG. 5 is a diagram illustrating an specific example of an autoencoder with loss function in accordance with an illustrative embodiment.

With reference now to FIG. 5, a diagram illustrating an specific example of an autoencoder with loss function is depicted in accordance with an illustrative embodiment. Autoencoder with loss function 500 may be, for example, autoencoder 411 in FIG. 4. Autoencoder with loss function 500 includes autoencoder 502 and loss function 504. It should be noted that autoencoder 502 and loss function 504 are meant as specific examples of an autoencoder and a loss function only and not as limitations on illustrative embodiments. In other words, illustrative embodiments may utilize different autoencoders and loss functions.

For each row of data in a data asset, such as, for example, input data asset 418 in FIG. 4, to be transformed, a data distribution preserver, such as, for example, data distribution preserver 218 in FIG. 2, selects columns of interest containing sensitive data in the data asset that need transformation as input to autoencoder 502 with loss function 504. The number of layers and depth of bottleneck of autoencoder 502 and loss function 504 determine how each row of data is transformed. Loss function 504 also determines a variance measure of each of the columns of interest. When performed for each respective row, autoencoder 502 preservers the original distribution of values of the input data asset to the output data asset.

It should be noted that a set of autoencoders can cover several combinations of types of data asset columns. Also, loss function parametric coefficients provide variability and can be controlled by policies. For example, when a value of a particular parametric coefficient, which measures variance within a column between the input data asset and the output data asset, is not zero (0), autoencoder 502 is considering projection columns. The data distribution preserver needs to determine canonical columns and create autoencoders that can cover all combinations of autoencoders.

Loss function (LF) 504 has three parametric coefficients arranged as a weighted function. The weights specific to data asset variance provides the variability of the depth of distribution preservation. The parametric coefficient rho ($\rho$) of the loss function measures column specific variance over the data asset. In other words, rho minimizes the distance between the mean of the columns of interest containing relevant data classes over the entire data asset. The parametric coefficient phi ($\phi$) of the loss function measures intra-row/inter-column specific variance. In other words, phi minimizes the distance between columns of interest within a particular row of data. The parametric coefficient tau ($\tau$) of the loss function measures data asset specific variance. In other words, tau minimizes the orthogonal distance of the output row to the best fitting hyperplane of the data asset. The data distribution preserver generates the hyperplane based on relevant data classes of the data asset. Thus, LF=$\rho$(variance within a column of interest)+$\phi$(intra-row columns of interest distance)+$\tau$(orthogonal distance from best fit hyperplane). It should be noted that loss function 504 may be computed pre- or post-mapping of real to pseudo row values.

Figure 6:
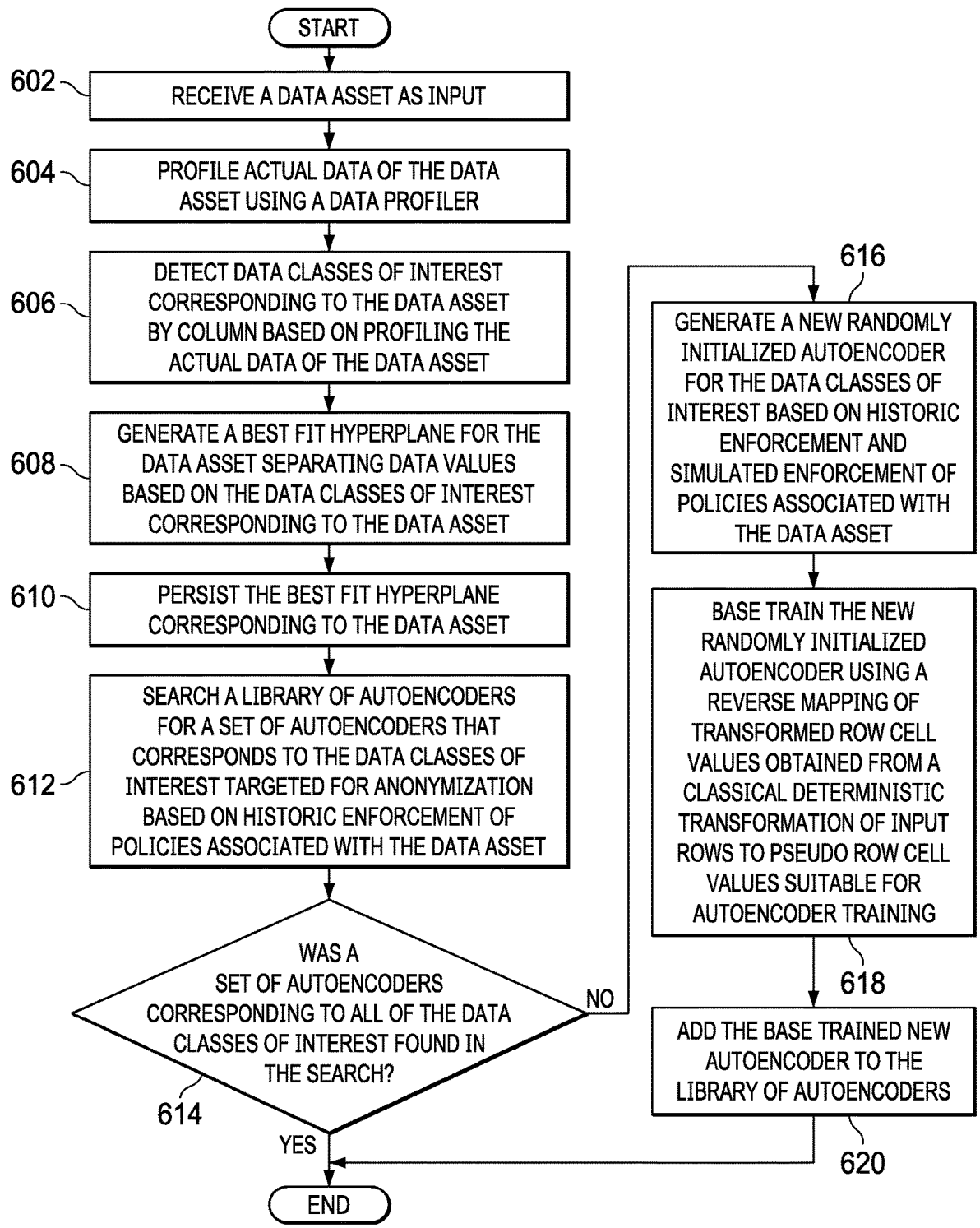
FIG. 6 is a flowchart illustrating a process for data classification and autoencoder base training in accordance with an illustrative embodiment.

With reference now to FIG. 6, a flowchart illustrating a process for data classification and autoencoder base training is shown in accordance with an illustrative embodiment. The process shown in FIG. 6 may be implemented in a computer, such as, for example, server 104 in FIG. 1 or data processing system 200 in FIG. 2. For example, the process shown in FIG. 6 may be implemented in data distribution preserver 218 in FIG. 2.

The process begins when the computer receives a data asset as input (step 602). The computer profiles actual data of the data asset using a data profiler (step 604). The computer detects data classes of interest corresponding to the data asset by column based on profiling the actual data of the data asset (step 606).

The computer generates a best fit hyperplane for the data asset separating data values based on the data classes of interest corresponding to the data asset (step 608). The computer persists the best fit hyperplane corresponding to the data asset (step 610). The best fit hyperplane represents a base distribution signature of the data asset and a 0% distribution preservation distance threshold of the data asset. The computer utilizes the best fit hyperplane during data dissemination to compute the parametric coefficients of the loss function in conjunction with the prescribed distribution preservation directive. It should be noted that a 100% distribution preservation directive represents full preservation of the input data asset to be reflected in the output data asset and a 0% distribution preservation directive that is a "don't care" point in producing the data transformations by the autoencoder of the data classes of interest. The computer calculates the loss function threshold value by scaling the worst or largest orthogonal distance observed between all rows of data in the input data asset and the generated best fit hyperplane. The computer saves the largest cartesian distance from the input data asset, as well as "don't care" point or 0% distribution preservation directive in scaling the policy as a percentage.

The computer searches a library of autoencoders for a set of autoencoders that corresponds to the data classes of interest targeted for anonymization based on historic enforcement and simulated enforcement of policies associated with the data asset (step 612). The computer makes a determination as to whether a set of autoencoder corresponding to all of the data classes of interest was found in the search (step 614). If the computer determines that a set of autoencoder corresponding to all of the data classes of interest was found in the search, yes output of step 614, then the process terminates thereafter. If the computer determines that a set of autoencoders corresponding to all of the data classes of interest was not found in the search, no output of step 612, then the computer generates a new randomly initialized autoencoder for all of the data classes of interest based on the historic enforcement and the simulated enforcement of the policies associated with the data asset (step 616). Furthermore, the computer base trains the new randomly initialized autoencoder using a reverse mapping of transformed row cell values obtained from a classical deterministic transformation of input rows to pseudo row cell values suitable for autoencoder training (step 618). The classical deterministic transformation is a ground truth row cell value generation method using raw input row cell values. Afterward, the computer adds the base trained new autoencoder to the library of autoencoders (step 620). Thereafter, the process terminates.

Figure 7B:
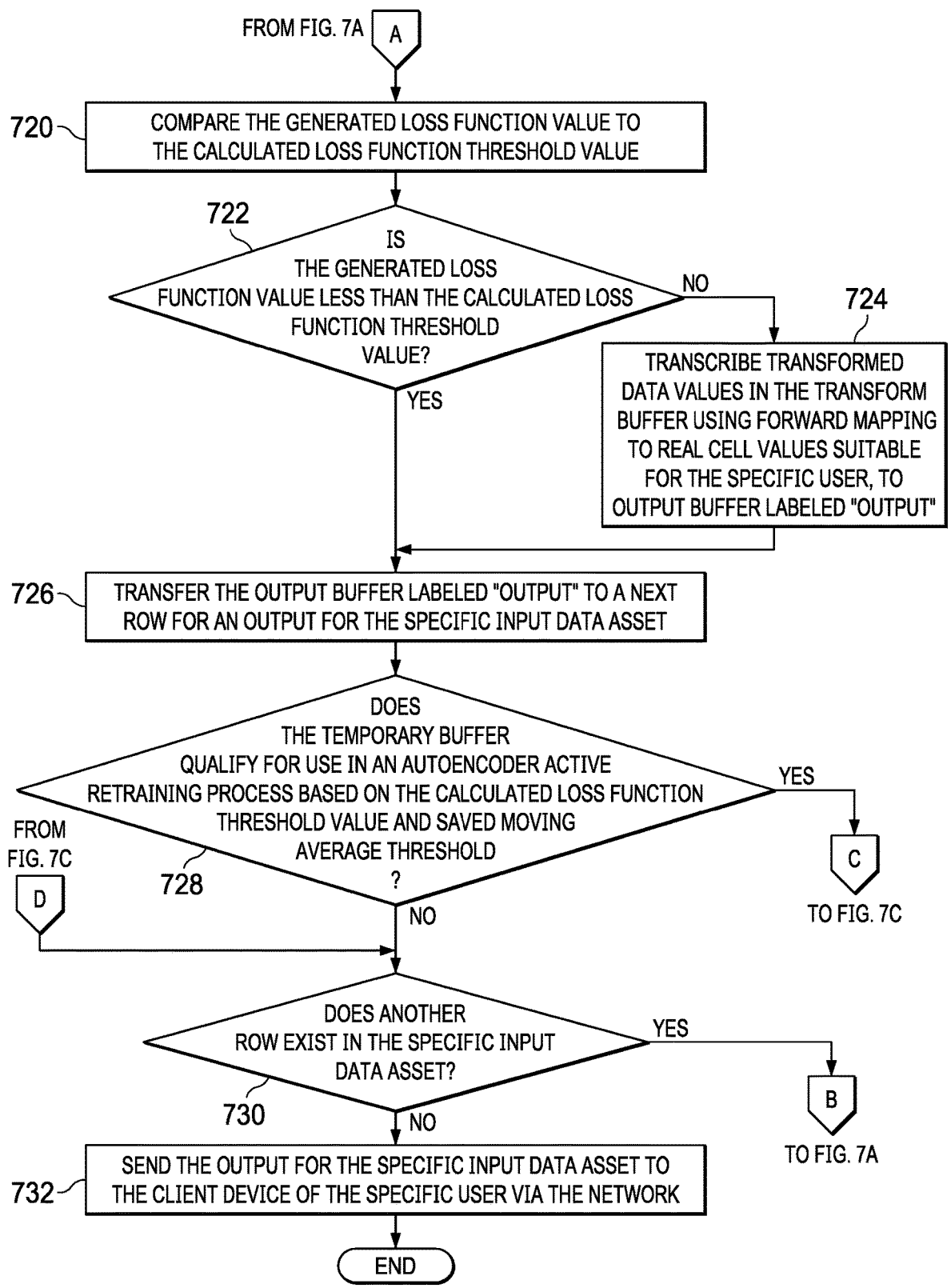
Figure 7C:
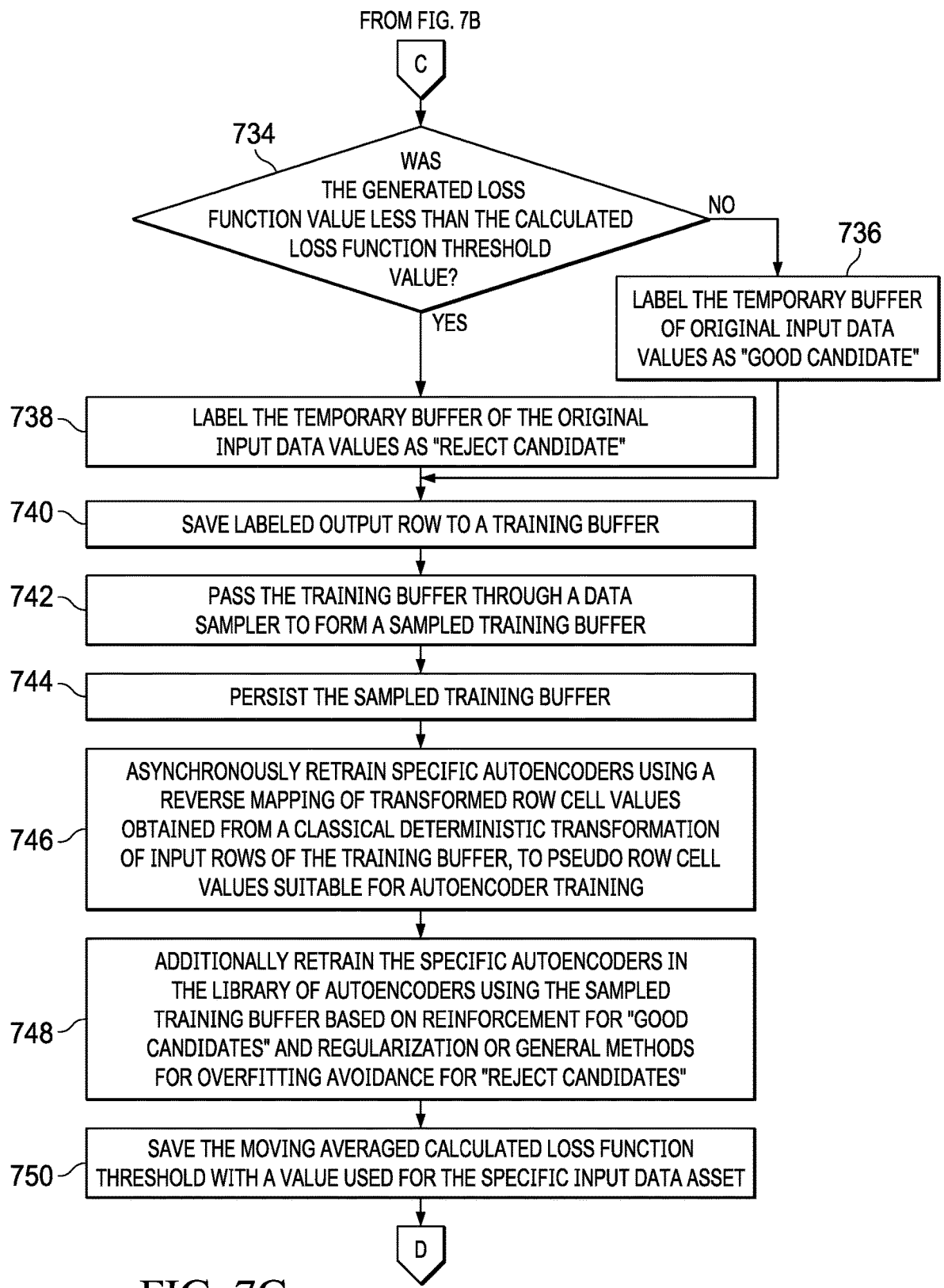

With reference now to FIGS. 7A-7C, a flowchart illustrating a process for policy enforcement to transform sensitive data is shown in accordance with an illustrative embodiment. The process shown in FIGS. 7A-7C may be implemented in a computer, such as, for example, server 104 in FIG. 1 or data processing system 200 in FIG. 2. For example, the process shown in FIGS. 7A-7C may be implemented in data distribution preserver 218 in FIG. 2.

The process begins when the computer receives a request to access data of a specific input data asset from a client device of a specific user via a network (step 702). The specific input data asset is a rectangular data set. In response to the computer receiving the request, a policy enforcement point of the computer requests a policy enforcement decision from a policy decision point of the computer regarding the specific input data asset, the specific user, and a context associated with the request (step 704). The policy decision point of the computer generates the policy enforcement decision regarding the specific input data asset, the specific user, and the context of the request based on a set of currently set policies (step 706). It should be noted that the policy enforcement decision also contains a percentage of desired data distribution preservation for the data classes of interest that may require transformation by a selected autoencoder of a library of autoencoders. This provides the necessary data classes to be transformed as dictated by policy and the data distribution preservation directive or threshold. In addition, the computer calculates a loss function threshold value for a loss function based on the policy enforcement decision (step 708).

Further, the computer selects an autoencoder from a library of autoencoders to perform needed data anonymizations on columns of interest containing sensitive data in the specific input data asset based on the policy enforcement decision (step 710). Afterward, the computer selects a row in the specific input data asset (step 712). The computer transcribes original input data values of the selected row to a temporary buffer (step 714). The computer performs the needed data anonymizations of the selected row using the selected autoencoder for transforming data values of the sensitive data in an associated set of row cells of the columns of interest to a transform buffer (step 716). The computer also generates a loss function value for the data anonymizations in the selected row using a loss function with parametric coefficients specified in the policy enforcement decision (step 718).

The computer compares the generated loss function value to the calculated loss function threshold value (step 720). The computer makes a determination as to whether the generated loss function value is less than the calculated loss function threshold value based on the comparison (step 722).

If the computer determines that the generated loss function value is not less than the calculated loss function threshold value based on the comparison, no output of step 722, then the computer transcribes transformed data values in the transform buffer using forward mapping to real row cell values suitable for the specific user to an output buffer labeled as output (step 724). Thereafter, the process proceeds to step 726. If the computer determines that the generated loss function value is less than the calculated loss function threshold value based on the comparison, yes output of step 722, then the computer transfers the output buffer labeled output to the next row for an output of the specific input data asset (step 726).

Furthermore, the computer makes a determination as to whether the temporary buffer qualifies for use in an autoencoder active retraining process based on the calculated loss function threshold value and saved moving average threshold (step 728). If the computer determines that the temporary buffer does not qualify for use in the autoencoder active retraining process, no output of step 728, then the computer makes a determination as to whether another row exists in the specific input data asset (step 730). If the computer determines that another row does exist in the specific input data asset, yes output of step 730, then the process returns to step 712 where the computer selects another row in the specific input data asset. If the computer determines that another row does not exist in the selected column, no output of step 730, then the computer sends the output for the specific input data asset to the client device of the specific user via the network (step 732). Thereafter, the process terminates.

Returning again to step 728, if the computer determines that the temporary buffer does qualify for use in the autoencoder active retraining process, yes output of step 728, then the computer makes a determination as to whether the generated loss function value was less than the calculated loss function threshold value (step 734). If the computer determines that the generated loss function value was not less than the calculated loss function threshold value, no output of step 734, then the computer labels the temporary buffer of the original input data values as a good candidate (step 736). Thereafter, the process proceeds to step 740. If the computer determines that the generated loss function value was less than the calculated loss function threshold value, yes output of step 734, then the computer labels the temporary buffer of the original input data values as a reject candidate (step 738).

Afterward, the computer saves the labeled output row to a training buffer (step 740). In addition, the computer passes the training buffer through a data sampler to form a sampled training buffer (step 742). In one illustrative embodiment, the data sampler is a random data sampler. The computer persists the sampled training buffer (step 744).

Further, the computer asynchronously retrains specific autoencoders using a reverse mapping of transformed row cell values obtained from the classical deterministic transformation of input rows of the training buffer to pseudo row cell values suitable for autoencoder training (step 746). The computer additionally retrains the specific autoencoders in the library of autoencoders using the sampled training buffer based on reinforcement for good candidates and regularization or general methods for overfitting avoidance for reject candidates (step 748). It should be noted that over time the retraining of autoencoders will use backpropagation and converge to a most frequently used threshold of data distribution preservation for a specific data class and autoencoder combination. Also, alternative illustrative embodiments may index the library of autoencoders by threshold so that when an autoencoder is searched for in the library, the threshold may also play a role in the selection process. The computer also saves the moving averaged calculated loss function threshold with a value that was used for the specific input data asset (step 750). Thereafter, the process returns to step 730 where the computer determines whether another row exists it the specific input data asset.

Thus, illustrative embodiments of the present invention provide a computer-implemented method, computer system, and computer program product for dynamically transforming sensitive data of a data asset in real time during data dissemination to a requesting data consumer. The specific transformation to the requested data during an anonymization operation is achieved while preserving transformed values of the output data distributions to a desired degree relative to the input data. Illustrative embodiments control this process declaratively based on policy using an autoencoder with parametrized loss function. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for preserving distributions of data values of a data asset in a data anonymization operation, the computer-implemented method comprising:

performing data anonymizations of a selected row in the data asset using an autoencoder for transforming data values of sensitive data in an associated set of row cells of columns of interest to a transform buffer;

generating a loss function value for the data anonymizations in the selected row using a loss function with parametric coefficients specified in a policy enforcement decision;

comparing the loss function value to a loss function threshold value;

transcribing transformed data values in the transform buffer using forward mapping to real row cell values suitable for a specific user to an output buffer labeled as output in response to determining that the loss function value is greater than the loss function threshold value based on the comparing; and transferring the output buffer labeled output to a next row for an output of the data asset.

2. The computer-implemented method of claim 1 further comprising:
sending the output for the data asset to a client device of a requesting user via a network.

3. The computer-implemented method of claim 1 further comprising:
receiving a request to access data of the data asset from a client device of the specific user via a network, wherein the data asset is a rectangular data set comprised of columns and rows;
requesting the policy enforcement decision regarding the data asset, the specific user, and a context of the request to access the data of the data asset;
generating the policy enforcement decision regarding the data asset, the specific user, and the context of the request to access the data of the data asset; and
calculating the loss function threshold value for the loss function based on the policy enforcement decision.

4. The computer-implemented method of claim 1 further comprising:
selecting the autoencoder from a library of autoencoders to perform the data anonymizations on the columns of interest containing the sensitive data in the data asset based on the policy enforcement decision; and
selecting a row of a plurality of rows in the data asset to form the selected row.

5. The computer-implemented method of claim 1 further comprising:
determining whether a temporary buffer of transcribed original input data values of the selected row qualifies for use in an autoencoder active retraining process;
responsive to determining that the temporary buffer does qualify for use in the autoencoder active retraining process, determining whether the loss function value was less than the loss function threshold value;
responsive to determining that the loss function value was not less than the loss function threshold value, labeling the temporary buffer as a good candidate or responsive to determining that the loss function value was less than the loss function threshold value, labeling the temporary buffer as a reject candidate; and
saving a labeled output row to a training buffer.

6. The computer-implemented method of claim 5 further comprising:
passing the training buffer through a data sampler to form a sampled training buffer;
asynchronously retraining specific autoencoders using a reverse mapping of transformed row cell values obtained from a classical deterministic transformation of input rows of the training buffer to pseudo row cell values suitable for autoencoder training; and
additionally retraining the specific autoencoders using the sampled training buffer based on reinforcement for good candidates and regularization for overfitting avoidance for reject candidates.

7. The computer-implemented method of claim 1 further comprising:
profiling actual data of the data asset;
detecting data classes of interest corresponding to the data asset by column based on the profiling of the actual data of the data asset; and
generating a best fit hyperplane for the data asset separating data values based on the data classes of interest corresponding to the data asset.

8. The computer-implemented method of claim 7 further comprising:
generating a new randomly initialized autoencoder for the data classes of interest based on historic enforcement and simulated enforcement of policies associated with the data asset in response to determining that an autoencoder corresponding to the data classes of interest was not found in a search of a library of autoencoders; and
base training the new randomly initialized autoencoder using a reverse mapping of transformed row cell values obtained from a classical deterministic transformation of input rows to pseudo row cell values suitable for autoencoder training.

9. The computer-implemented method of claim 1, wherein a Laplacian noise function is applied to anonymized data values as a differential privacy adjustment to prevent distribution inference.

10. The computer-implemented method of claim 1, wherein the policy enforcement decision is based on entropy of the data asset.

11. The computer-implemented method of claim 1, wherein the policy enforcement decision is based on sensitivity of the data asset regarding transformation changes.

12. A computer system for preserving distributions of data values of a data asset in a data anonymization operation, the computer system comprising:
a bus system;
a storage device connected to the bus system, wherein the storage device stores program instructions; and
a processor connected to the bus system, wherein the processor executes the program instructions to:
perform data anonymizations of a selected row in the data asset using an autoencoder for transforming data values of sensitive data in an associated set of row cells of columns of interest to a transform buffer;
generate a loss function value for the data anonymizations in the selected row using a loss function with parametric coefficients specified in a policy enforcement decision;
compare the loss function value to a loss function threshold value;
transcribe transformed data values in the transform buffer using forward mapping to real row cell values suitable for a specific user to an output buffer labeled as output in response to determining that the loss function value is greater than the loss function threshold value; and
transfer the output buffer labeled output to a next row for an output of the data asset.

13. The computer system of claim 12, wherein the processor further executes the program instructions to:
send the output for the data asset to a client device of a requesting user via a network.

14. The computer system of claim 12, wherein the processor further executes the program instructions to:
receive a request to access data of the data asset from a client device of the specific user via a network, wherein the data asset is a rectangular data set comprised of columns and rows;
request the policy enforcement decision regarding the data asset, the specific user, and a context of the request to access the data of the data asset;
generate the policy enforcement decision regarding the data asset, the specific user, and the context of the request to access the data of the data asset; and calculate the loss function threshold value for the loss function based on the policy enforcement decision.

15. A computer program product for preserving distributions of data values of a data asset in a data anonymization operation, the computer program product comprising a computer-readable storage medium having program instructions embodied therewith, the program instructions executable by a computer to cause the computer to a method of:

performing data anonymizations of a selected row in the data asset using an autoencoder for transforming data values of sensitive data in an associated set of row cells of columns of interest to a transform buffer;

generating a loss function value for the data anonymizations in the selected row using a loss function with parametric coefficients specified in a policy enforcement decision;

comparing the loss function value to a loss function threshold value;

transcribing transformed data values in the transform buffer using forward mapping to real row cell values suitable for a specific user to an output buffer labeled as output in response to determining that the loss function value is greater than the loss function threshold value based on the comparing; and transferring the output buffer labeled output to a next row for an output of the data asset.

16. The computer program product of claim 15 further comprising:

sending the output for the data asset to a client device of a requesting user via a network.

17. The computer program product of claim 15 further comprising:

receiving a request to access data of the data asset from a client device of the specific user via a network, wherein the data asset is a rectangular data set comprised of columns and rows;

requesting the policy enforcement decision regarding the data asset, the specific user, and a context of the request to access the data of the data asset;

generating the policy enforcement decision regarding the data asset, the specific user, and the context of the request to access the data of the data asset; and calculating the loss function threshold value for the loss function based on the policy enforcement decision.

18. The computer program product of claim 15 further comprising:

selecting the autoencoder from a library of autoencoders to perform the data anonymizations on the columns of interest containing the sensitive data in the data asset based on the policy enforcement decision; and selecting a row of a plurality of rows in the data asset to form the selected row.

19. The computer program product of claim 15 further comprising:

determining whether a temporary buffer of transcribed original input data values of the selected row qualifies for use in an autoencoder active retraining process;

responsive to determining that the temporary buffer does qualify for use in the autoencoder active retraining process, determining whether the loss function value was less than the loss function threshold value;

responsive to determining that the loss function value was not less than the loss function threshold value, labeling the temporary buffer as a good candidate or responsive to determining that the loss function value was less than the loss function threshold value, labeling the temporary buffer as a reject candidate; and saving a labeled output row to a training buffer.

20. The computer program product of claim 19 further comprising:

passing the training buffer through a data sampler to form a sampled training buffer;

asynchronously retraining specific autoencoders using a reverse mapping of transformed row cell values obtained from a classical deterministic transformation of input rows of the training buffer to pseudo row cell values suitable for autoencoder training; and additionally retraining the specific autoencoders using the sampled training buffer based on reinforcement for good candidates and regularization for overfitting avoidance for reject candidates.

* * * * *